United States Patent
Gray et al.

(10) Patent No.: US 11,864,480 B2
(45) Date of Patent: Jan. 9, 2024

(54) TILLAGE IMPLEMENT WITH AUXILIARY ROLLERS

(71) Applicant: Salford Group Inc., Salford (CA)

(72) Inventors: Geof J. Gray, Burford (CA); Jacobus A. Rozendaal, Delhi (CA); John Mark Averink, Norwich (CA); Ravikesh Ashok Khadtare, Guelph (CA); Christopher Michael Poppe, Mitchell (CA); Frederick Kristoffer Gordon Wright, St. Thomas (CA); Magnus Claussen, London (CA)

(73) Assignee: SALFORD GROUP INC., Salford (CA)

( * ) Notice: Subject to any disclaimer, the term of this patent is extended or adjusted under 35 U.S.C. 154(b) by 198 days.

(21) Appl. No.: 17/517,822

(22) Filed: Nov. 3, 2021

(65) Prior Publication Data
US 2022/0132720 A1    May 5, 2022

Related U.S. Application Data

(60) Provisional application No. 63/109,579, filed on Nov. 4, 2020.

(51) Int. Cl.
| | |
|---|---|
| *A01B 49/02* | (2006.01) |
| *A01B 73/06* | (2006.01) |
| *A01B 63/32* | (2006.01) |
| *A01B 73/04* | (2006.01) |

(52) U.S. Cl.
CPC ............ *A01B 49/027* (2013.01); *A01B 63/32* (2013.01); *A01B 73/048* (2013.01); *A01B 73/065* (2013.01)

(58) Field of Classification Search
CPC ....... A01B 49/027; A01B 63/32; A01B 73/02; A01B 73/046; A01B 73/048; A01B 73/06; A01B 73/065; A01B 73/067; A01B 29/06; A01B 29/048; A01B 33/02; A01B 33/024; A01B 33/087
See application file for complete search history.

(56) References Cited

U.S. PATENT DOCUMENTS

| | | |
|---|---|---|
| 7,762,345 B2 | 7/2010 | Rozendaal et al. |
| 10,212,873 B2 * | 2/2019 | Roberge ................. A01B 49/06 |

(Continued)

OTHER PUBLICATIONS

Ag Talk thread post dated Nov. 9, 2020 on "My vertical till build".

*Primary Examiner* — Thomas B Will
*Assistant Examiner* — Audrey L Lusk
(74) *Attorney, Agent, or Firm* — Brunet & Co.; Robert Brunet; Hans Koenig

(57) ABSTRACT

A tillage implement has a frame connectable to a towing vehicle and at least two transverse rows of secondary tillage tools mounted on the frame, the at least two transverse rows comprising a row of main rollers mounted on the frame rearward of all other rows of the at least two transverse rows. The implement also has a transverse row of auxiliary rollers mounted rearward of the row of main rollers, the transverse row of auxiliary rollers independently pivotable vertically about a transverse pivot axis. The implement has at least one ground-engaging wheel. Independent pivoting of the row of auxiliary rollers allows an operator to increase tillage/field finish on the go or as needed.

16 Claims, 12 Drawing Sheets

(56) References Cited

U.S. PATENT DOCUMENTS

| | | | |
|---|---|---|---|
| 11,696,522 B2* | 7/2023 | Sigut | A01B 73/044 |
| | | | 172/176 |
| 2015/0053437 A1* | 2/2015 | Kovach | A01B 29/048 |
| | | | 172/149 |
| 2019/0000002 A1* | 1/2019 | Steinlage | A01B 27/005 |
| 2019/0166753 A1* | 6/2019 | Hoffman | A01B 49/027 |
| 2019/0380253 A1* | 12/2019 | Thielicke | A01B 49/027 |
| 2020/0390020 A1* | 12/2020 | Schaffer | A01B 61/046 |
| 2022/0248590 A1* | 8/2022 | Fogelin | A01B 63/111 |

* cited by examiner

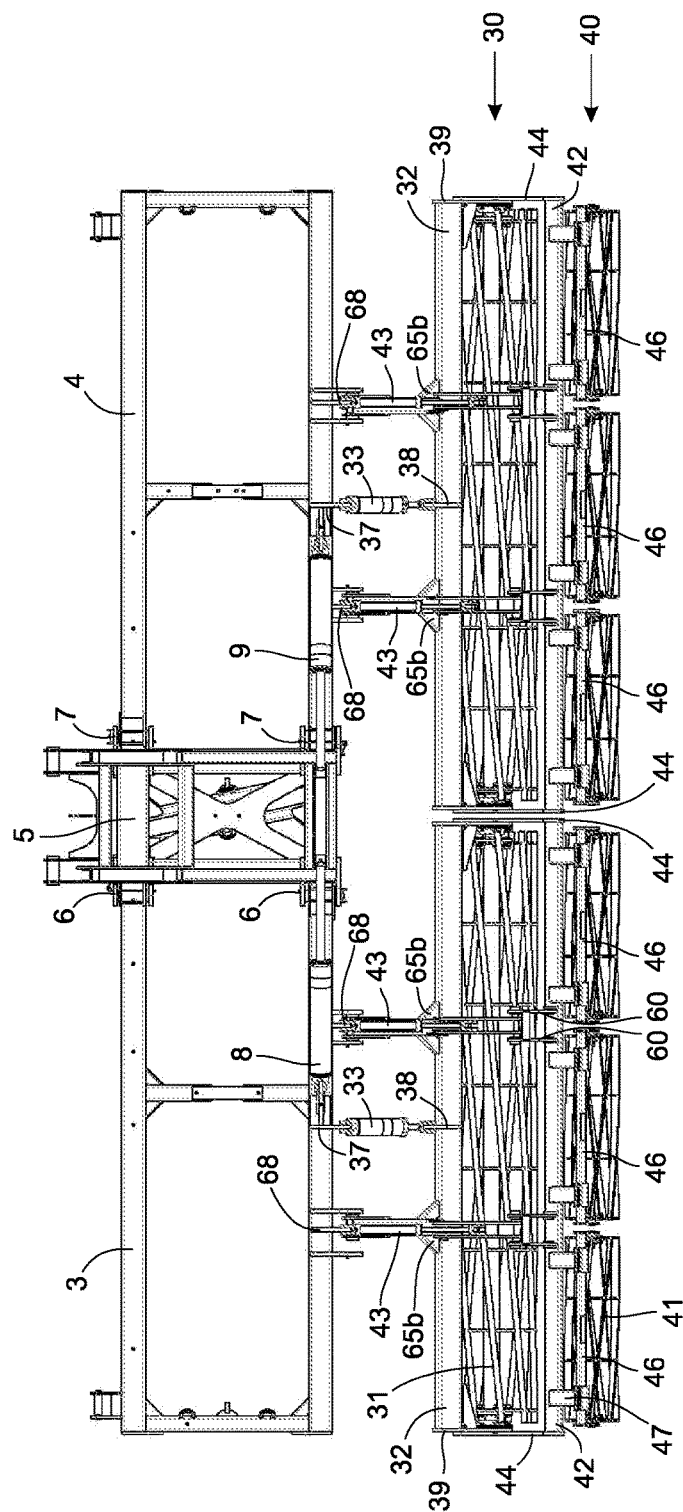

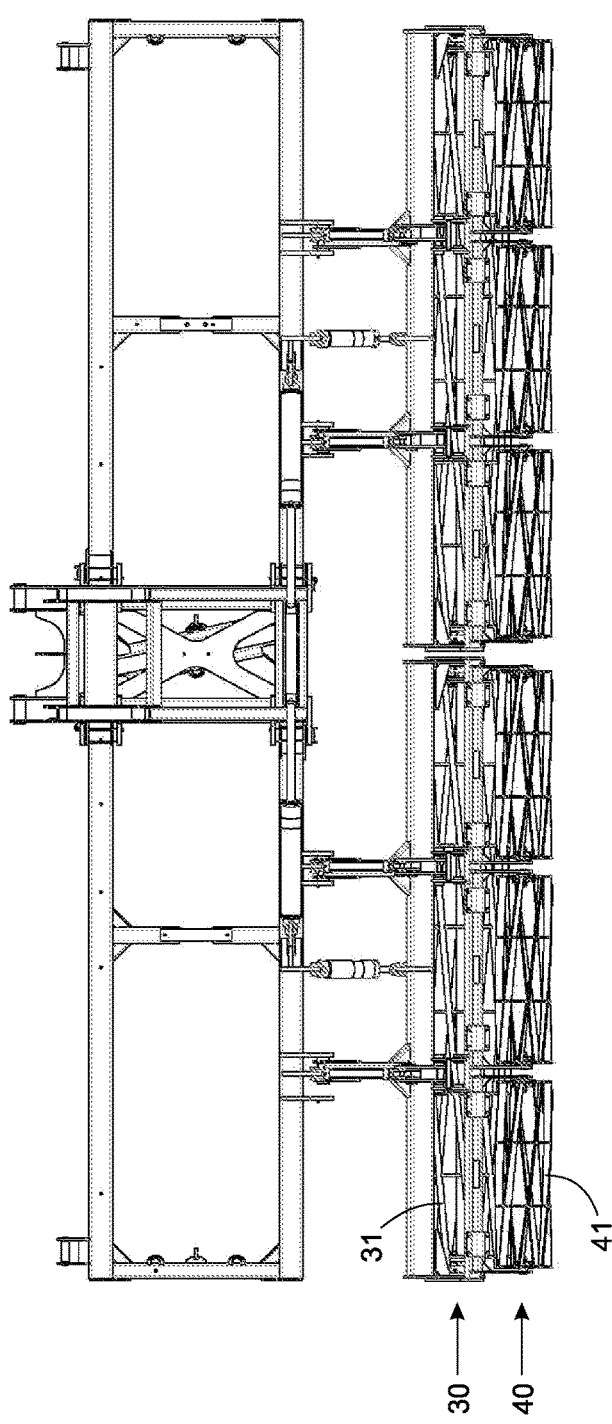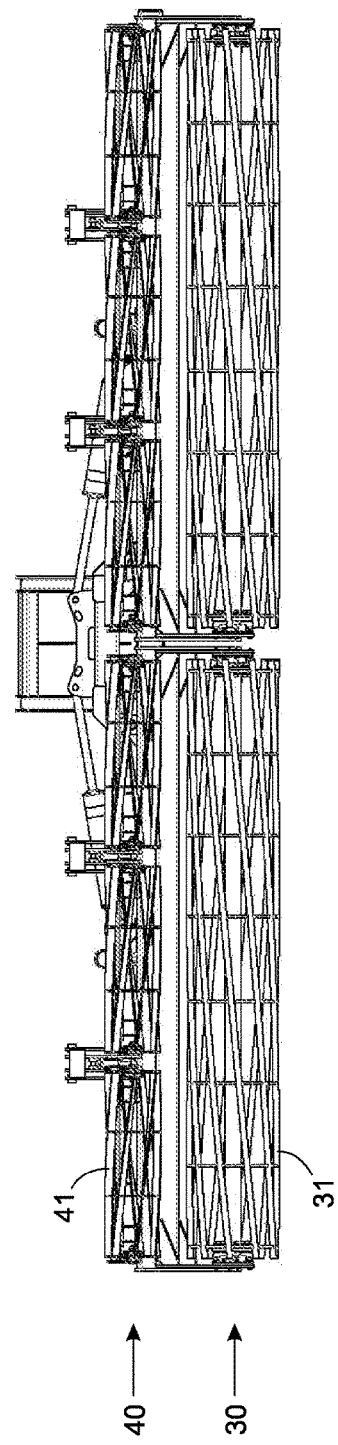

TILLAGE IMPLEMENT WITH AUXILIARY ROLLERS

CROSS-REFERENCE TO RELATED APPLICATIONS

This application claims the benefit of U.S. Provisional Patent Application U.S. Ser. No. 63/109,579 filed Nov. 4, 2020, the entire contents of which is herein disclosed by reference.

FIELD

This application relates to agriculture, in particular to tillage implements.

BACKGROUND

Modular tillage implements having the facility to fold between a transport configuration and a deployed configuration are desirable to farmers who need to transport large implements between fields. Such folding implements in which outer frame sections fold up and toward a center of the frame, and, in some implements, a center frame section folds up and forward into a transport configuration compactify the implement sufficiently in a transverse direction to be able to tow the implement down a single lane of a normal roadway. However, to accomplish this, the wheels of the implement may be arranged in front of the frame, or some other suitable location, so that the wheels remain in contact with the ground during transport. Further, the presence of wheels in some locations creates difficulties for folding and potentially adds to the height of the implement when the implement is in the transport configuration, the latter of which potentially causing interference with overhead wires and overpasses. Therefore, such folding implements are favorably constructed having no wheels in unsuitable locations for folding the implement.

However, by locating the wheels in front of the frame, or at other locations to facilitate folding of the implement, balancing the implement in the deployed configuration during a tillage operation becomes a problem. The balance problem can be solved by using accumulators to balance down pressure on a rear row of rollers, but another method is desirable.

There is also a need to equip tillage implements with a means for finer seed bed preparation than is possible with the typical rear row of rollers on tillage implements. Providing such a means can exacerbate problems with balancing the implement as well as sacrificing the ability to fold the implement into a sufficiently low profile for transport on a roadway.

Thus, there remains a challenge to provide a tillage implement with a means for fine seed bed preparation without unbalancing the implement and without sacrificing the ability to fold the implement between the deployed configuration and a transport configuration having a sufficiently low profile.

SUMMARY

A tillage implement comprises: a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field; at least two transverse rows of secondary tillage tools mounted on the frame, the at least two transverse rows comprising a row of main rollers mounted on the frame rearward of all other rows of the at least two transverse rows; a transverse row of auxiliary rollers mounted rearward of the row of main rollers, the transverse row of auxiliary rollers independently pivotable vertically about an auxiliary roller transverse pivot axis; and, at least one ground-engaging wheel.

The implement comprises at least two transverse rows of secondary tillage tools, preferably at least three transverse rows of secondary tillage tools, for example three transverse rows or four transverse rows. Secondary tillage tools include, for example, coulters, rollers, aeration tines, tillage shanks or any combination thereof. Coulters may be straight or dish-shaped. Coulters may be smooth, fluted, notched or treader coulters, and the like. Rollers include, for example, harrow rollers, packer rollers, rollers of aeration tines and the like. In some embodiments, the secondary tillage tools may comprise coulters, rollers or both coulters and rollers. If desired, at least one transverse row of primary tillage tools may be mounted on the frame. Primary tillage tools include one or more of chisel plows, disc harrows and the like.

The implement preferably comprises a forwardly extending tongue connected to the frame for connecting the implement to the towing vehicle. Connection to the towing vehicle is accomplished through a hitch proximate a forward end of the tongue. The tongue is preferably part of a tongue assembly, with the tongue connected to the frame through the tongue assembly. The at least one ground-engaging wheel is preferably rotatably mounted on one or more axles. The at least one ground-engaging wheel may be located longitudinally forward or rearward of all of the tillage tools, or may be located between rows of tillage tools. In some embodiments, the at least one ground-engaging wheel is located forward of the forward-most transverse row of tillage tools. In some embodiments, the at least one ground-engaging wheel is located longitudinally forward of the frame. In some embodiments, the at least one ground-engaging wheel is mounted on the tongue assembly. The implement preferably has at least two ground-engaging wheels. The at least two ground-engaging wheels are preferably transversely spaced-apart to provide lateral balance for the implement. In some embodiments, the at least two ground-engaging wheels is two ground-engaging wheels.

The frame is preferably foldable between a folded transport position and an unfolded deployed configuration. The frame is preferably pivotably connected to the tongue assembly. The frame preferably comprises at least one foldable frame section. The frame sections are preferably pivotable about respective frame section pivot axes to fold the frame into the transport configuration and to unfold the frame into the deployed configuration.

In some embodiments, the frame comprises two frame sections including a wing frame section and a center section. The wing frame section preferably pivots about a longitudinal axis to fold up and toward a center of the frame into the transport configuration or down and laterally into the deployed configuration. In some embodiments the frame comprises at least three frame sections including left, right and center frame sections. The right and left frame sections are preferably pivotably connected to the center frame section. The right and left frame sections preferably pivot about respective longitudinal axes to fold up and toward a center of the frame into the transport configuration or down and laterally into the deployed configuration.

The center frame section is preferably pivotably connected to the tongue assembly. The center frame section preferably pivots about a center frame section pivot axis, which is a transverse pivot axis that permits folding the center frame section up and forward into the transport configuration and unfolding the center frame section down and rearward into the deployed configuration. However, in some embodiments, the center frame section does not pivot even if the wing frame section does pivot or first and second frame sections do pivot.

When folding the frame into the transport configuration, the wing section or the left and right frame sections are preferably pivoted first followed by pivoting the center frame section, while the reverse occurs to unfold the frame into the deployed configuration. Pivoting of the various frame section may be accomplished by operation of at least one actuator associated with each frame section. Thus, the implement preferably comprises at least one center frame actuator connecting the center frame section to the tongue assembly and: at least one wing frame actuator connecting the wing frame section to the center frame section; or, at least one left frame actuator connecting the left frame section to the center frame section and at least one right frame actuator connecting the right frame to the center frame section.

In some embodiments, the row of main rollers is pivotably mounted on the frame. In some embodiments, the row of main rollers is pivotably connected to the frame by at least one of the longitudinal frame elements, the at least one of the longitudinal frame elements pivotally connected to at least one of the transverse frame elements of the frame. Pivoting of the row of main rollers causes the frame to translate vertically when the main rollers are engaging the field. Pivoting of the row of main rollers preferably occurs about a transverse main roller pivot axis. Pivoting of the row of main rollers is preferably accomplished with at least one main roller row actuator connecting the row of main rollers to the frame. Preferably, the at least one main roller row actuator comprises at least two main roller row actuators, for example two main roller row actuators. As the frame translates vertically, the row of auxiliary roller rises with the frame thereby disengaging the auxiliary rollers from the field. Auxiliary rollers in the row of auxiliary rollers preferably have smaller roller diameter, faster roller rotation and closer spacing of the bars in the row of auxiliary rollers compared to main rollers in the row of main rollers. When an operator needs to lift the implement using the wheels and the main rollers in normal operation, the row of auxiliary rollers automatically disengages from the field thereby preventing skidding without the need to pivot the row of auxiliary rollers. Further, with a smaller roller diameter, faster roller rotation and closer spacing of the bars in the row of auxiliary rollers compared to the row of main rollers, tillage pass effectiveness can be improved considerably. Preferably, the row of main rollers comprise main rollers mounted on a transversely extending main roller toolbar to form a gang of main rollers. Preferably, the main roller toolbar is pivotably mounted on the frame. Preferably, the main rollers are rotatably mounted on the main roller toolbar.

The transverse row of auxiliary rollers is independently pivotable vertically about the auxiliary roller transverse pivot axis. Thus, the transverse row of auxiliary rollers can be pivoted up and down without translating the frame vertically and without pivoting the row of main rollers. While pivoting the row of main rollers and translating the frame vertically may cause vertical translation of the row of auxiliary rollers, the pivoting of the row of auxiliary rollers is a separate motion from vertical translation caused by the pivoting of the row of main rollers. Preferably, the row of auxiliary rollers comprise auxiliary rollers mounted on a transversely extending auxiliary roller toolbar to form a gang of auxiliary rollers. Preferably, the auxiliary roller toolbar is independently pivotable vertically about the auxiliary roller transverse pivot axis. Preferably, the auxiliary rollers are rotatably mounted on the auxiliary roller toolbar.

The transverse row of auxiliary rollers may be independently pivotable by any suitable method, for example manually, with a chain-sprocket-motor combination, with an actuator-linkage combination, etc. Pivoting of the row of auxiliary rollers is preferably accomplished with at least one auxiliary roller row actuator. The at least one auxiliary roller row actuator preferably connects the row of auxiliary rollers to the frame. Preferably, the at least one auxiliary roller row actuator comprises at least two auxiliary roller row actuators, for example two auxiliary roller row actuators. In some embodiments, each of the at least one auxiliary roller row actuators is pivotally connected to the row of auxiliary rollers by a corresponding linkage assembly. Further, each corresponding linkage assembly may be pivotally connected to the row of main rollers. In some embodiments, each corresponding linkage assembly comprises a first linkage arm and a second linkage arm. In some embodiments, the first linkage arm is pivotally connected to the corresponding auxiliary roller actuator, the second linkage arm and the row of main rollers. In some embodiments, the second linkage arm is pivotally connected to the first linkage arm and the row of auxiliary rollers.

In some embodiments, the first linkage arm comprises a bent plate. In some embodiments, the first linkage arm is pivotally connected to the second linkage arm proximate a first end of the bent plate. In some embodiments, the first linkage arm is pivotally connected to the row of main rollers proximate a second end of the bent plate. In some embodiments, the first linkage arm is pivotally connected to the corresponding auxiliary roller actuator proximate a bend in the bent plate between the first and second ends.

In implements that have more than one frame section, one or more than one of the frame sections may comprise at least two transverse rows of secondary tillage tools mounted on the frame, the at least two transverse rows comprising a row of main rollers mounted on the frame rearward of all other rows of the at least two transverse rows, and a transverse row of auxiliary rollers. Pivoting and other movements of the frame sections, the rows of secondary tillage tools and/or the row of auxiliary rollers may be controllable together or independently.

The various actuators described herein may comprise any suitable actuator, for example hydraulic cylinders, pneumatic cylinders, linear actuators, mechanical actuators and the like. Hydraulic cylinders are preferred.

The presence of the row of auxiliary rollers assists with balancing the implement during a tillage operation, while independent pivoting of the row of auxiliary rollers allows an operator to increase tillage/field finish on the go or as needed. For example, in spring in drier conditions, the operator will want to use the auxiliary rollers to provide for a finer seedbed.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 2B is a top view of FIG. 2A.

FIG. 2C is a rear view of FIG. 2A.

FIG. 3B is a top view of FIG. 3A.

FIG. 3C is a rear view of FIG. 3A.

DETAILED DESCRIPTION

Figure 1A:
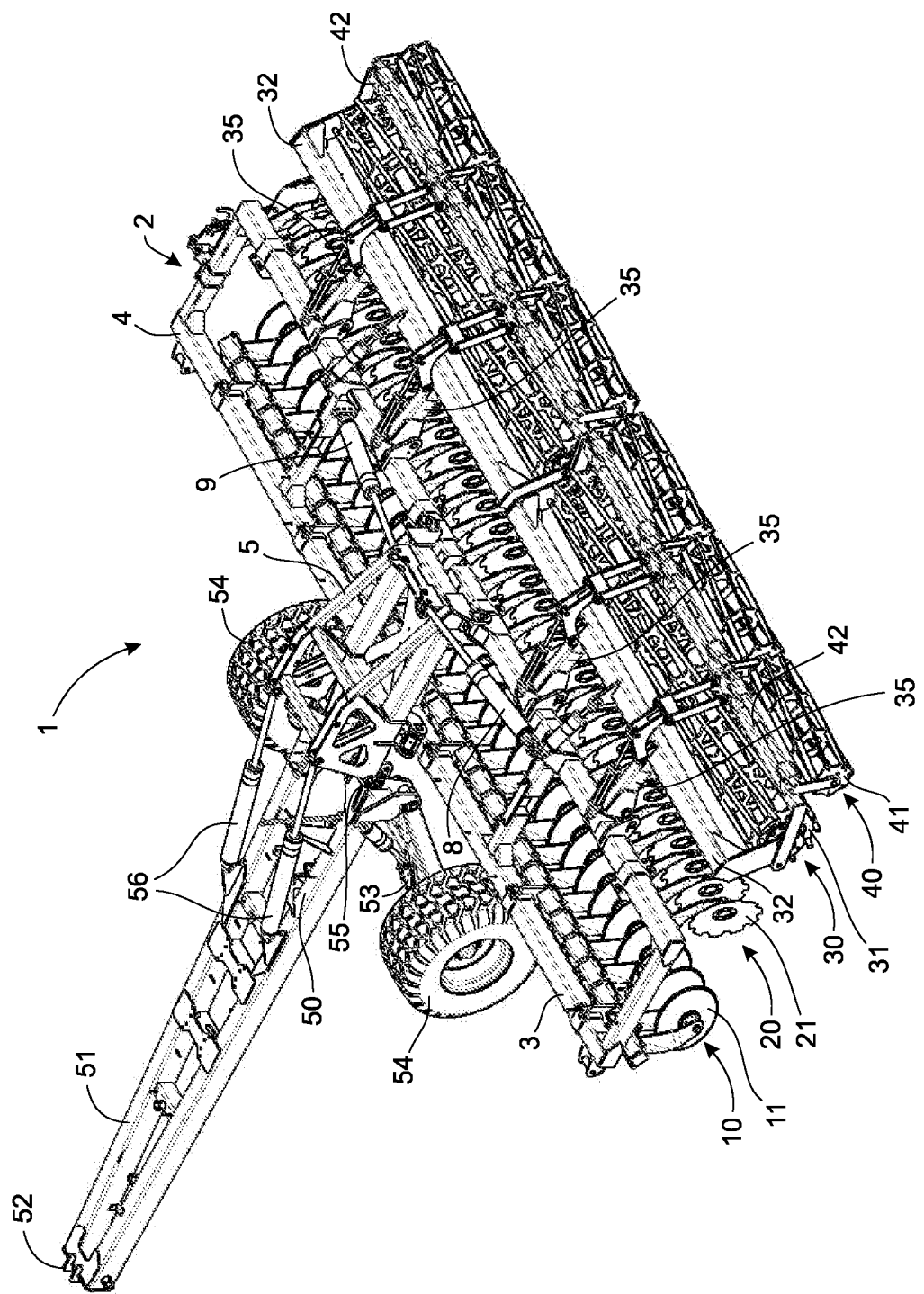
FIG. 1A is a perspective view of a secondary tillage implement in a deployed configuration, the tillage implement having three transverse rows of tillage tools including two transverse rows of coulters, a transverse row of main rollers to the rear of the two rows of coulters, and also having an independently pivotable transverse row of auxiliary rollers mounted at a rear end of the tillage implement, the row of auxiliary rollers pivotable up and down about a transverse pivot axis.
Figure 1B:
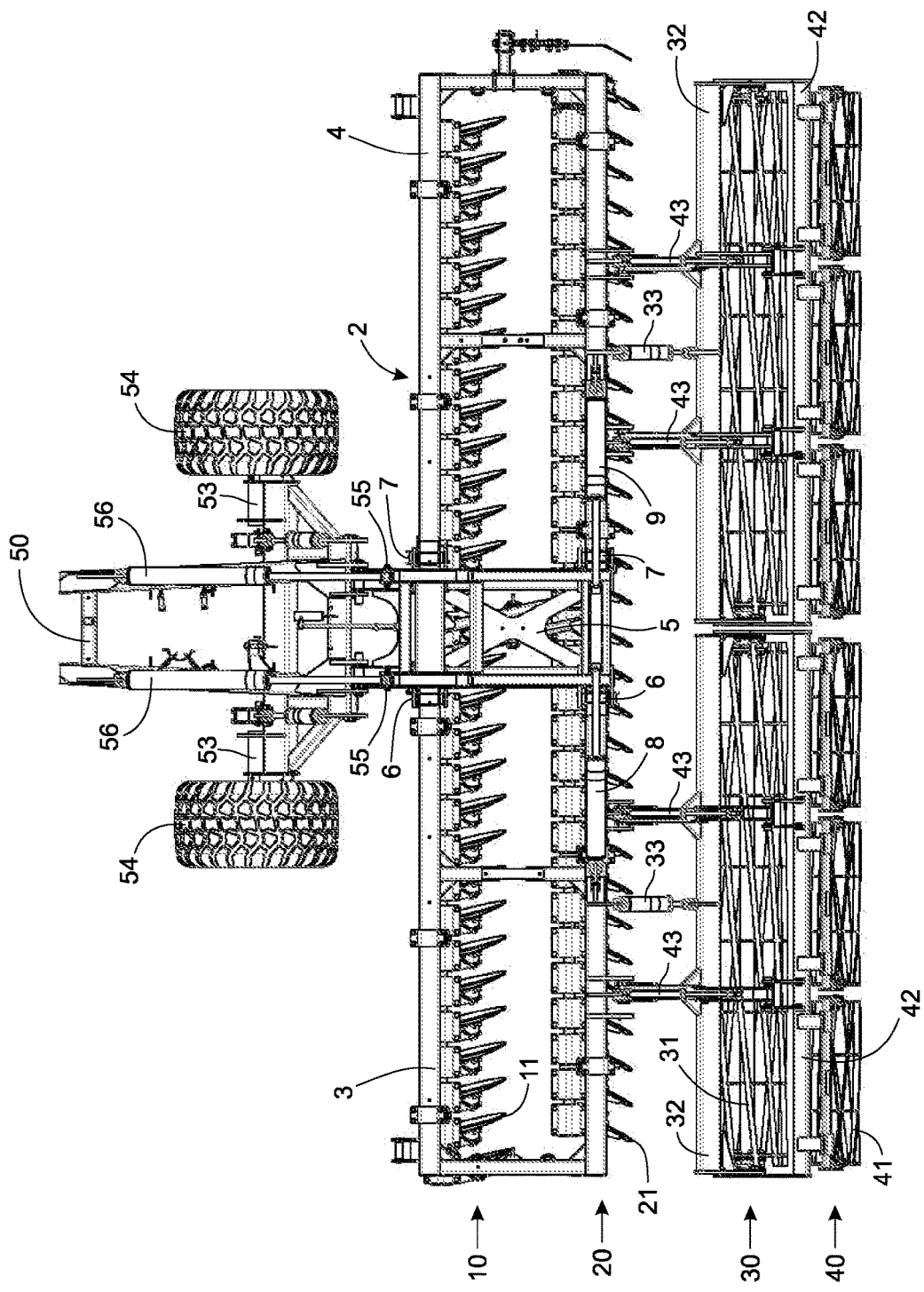
FIG. 1B is a top view the implement of FIG. 1A with a tongue omitted.

FIG. 1A and FIG. 1B depict an embodiment of a tillage implement 1 of the present invention. The implement 1 comprises a frame 2 having a left frame section 3, a right frame section 4 and a center frame section 5. On the frame 2 are mounted three transverse rows of secondary tillage tools including a forwardmost first row 10 of smooth coulters 11 (only one labeled), a second row 20 of notched coulters 21 (only one labeled) rearward of the first row 10, and a third row 30 of main rollers 31 (only one labeled) rearward of the second row 20. The implement 1 further comprises a transverse row 40 of auxiliary rollers 41 (only one labeled) pivotably mounted to both the frame 2 and the third row 30 rearward of the third row 30. The main rollers 31 are rotatably mounted on left and right transversely extending main roller toolbars 32, the main roller toolbars 32 being mounted on the frame 2. The auxiliary rollers 41 are rotatably mounted on left and right transversely extending auxiliary roller toolbars 42, the auxiliary roller toolbars 42 being mounted on the frame 2 and the main roller toolbars 32. All of the tillage tools 11,21,31,41 are mounted on either the left frame section 3 or the right frame section 4, while none of the tillage tools 11,21,31,41 are mounted on the center frame section 5.

Connected to the frame 2 at a front of the frame 2 is a tongue assembly 50. The tongue assembly 50 comprises a forwardly-extending tongue 51 terminating in a hitch 52 for connection to a towing vehicle. The tongue comprises axle mounts on left and right sides of the tongue assembly 50 on which axles 53 for a pair of transversely spaced-apart wheels 54 are rotatably mounted. The wheels 54 permit the implement 1 to be towed in both the deployed and transport configurations.

The left frame section 3 and the right frame section 4 are pivotably mounted on the center frame section 5 through longitudinally-oriented pivot pins 6 and 7, respectively. The pivot pins 6 permit the left frame section 3 to pivot up and inward toward the center of the implement 1 (or down and outward away from the center of the implement 1) about a longitudinally-oriented left frame section pivot axis on the left side of the implement 1. Pivoting of the left frame section 3 is accomplished with a transversely-oriented left frame section hydraulic cylinder 8 pivotally connected to the left frame section 3 and the center frame section 5. The pivot pins 7 permit the right frame section 4 to pivot up and inward toward the center of the implement 1 (or down and outward away from the center of the implement 1) about a longitudinally-oriented right frame section pivot axis on the right side of the implement 1. Pivoting of the right frame section 4 is accomplished with a transversely-oriented right frame section hydraulic cylinder 9 pivotally connected to the right frame section 4 and the center frame section 5.

The center frame section 5 is pivotably mounted on the tongue assembly 50 through transversely-oriented pivot pins 55. The pivot pins 55 permit the center frame section 5, and therefore the whole frame 2, to pivot up and forward (or down and rearward) about a transversely-oriented center frame section pivot axis. Pivoting of the center frame section 5 is accomplished with a pair of longitudinally-oriented center frame section hydraulic cylinders 56 pivotally connected to the center frame section 5 and the tongue assembly 50.

Referring to FIG. 2A to FIG. 4C, pivoting functionalities of the row 30 of main rollers 31 and the row 40 of auxiliary rollers 41 are illustrated.

The main rollers 31 are rotatably mounted on the main roller toolbars 32. The main roller toolbars 32 are fixedly mounted to pivoting longitudinally extending frame elements 35, the pivoting longitudinally extending frame elements 35 pivotally mounted on the frame 2 at pivot pins 36. Two longitudinally extending frame elements 35 are mounted to the left frame section 3 and two are mounted to the right frame section 4 so that each of the left and right main roller toolbars 32 are pivotably supported on the frame 2 by two longitudinally extending frame elements 35. Left and right main roller row hydraulic cylinders 33 are pivotally mounted on the frame 2 through flanges 37 fixedly attached to the frame 2. The main roller row hydraulic cylinders 33 are also pivotally mounted on the main roller toolbars 32 through flanges 38 fixedly attached to the main roller toolbars 32. Actuation of the main roller row hydraulic cylinders 33 pivots the main roller toolbars 32 arcuately up and down, thereby pivoting the row 30 of main rollers 31 arcuately up and down. The left and right main roller toolbars 32 are pivoted by actuation of the left and right main roller row hydraulic cylinders 33, respectively, such that one main roller row toolbar 32 is pivoted by one main roller row hydraulic cylinder 33. The main roller row hydraulic cylinders 33 may be operated in tandem or independent of each other.

The auxiliary rollers 41 are rotatably mounted in roller mounts 46, the roller mounts 46 fixedly mounted on the auxiliary roller toolbars 42 through mounting plates 47 (not all twelve labeled). The auxiliary roller toolbars 42 are pivotally mounted on the main roller toolbars 32 through legs 44. The legs 44 are located at ends of the toolbars 32, 42. The legs 44 are fixedly connected to the auxiliary roller toolbars 42, and are pivotally connected to the main roller toolbars 32 at pivots 45 on end brackets 39 of the main roller toolbars 32. The legs 44 act as supports for the auxiliary roller toolbars 42. The auxiliary roller toolbars 42 are also pivotally mounted on the main roller toolbars 32 through linkage assemblies 60 comprising first linkage arms 61 pivotally connected at pivots 63 to second linkage arms 62. The linkage assemblies 60 are pivotally connected to the auxiliary roller toolbars 42 through the second linkage arms 62 at pivot lugs 64 fixedly attached to the auxiliary roller toolbars 42. The linkage assemblies 60 are also pivotally connected to the main roller toolbars 32 through the first linkage arms 61 at pivot points 65*a* in pivot lugs 65*b*. The first linkage arms 61 comprise bent plates having pivotal connection points at ends of the plates corresponding to the pivots 63 and the pivot points 65*a* in the pivot lugs 65*b*, while the second linkage arms 62 are straight flanges having pivotal connection points at ends of the flanges corresponding to the pivots 63 and the pivot lugs 64. The first linkage arms 61 also has pivotal connection points 66 at apexes 69 of the bends in the plates where auxiliary roller row hydraulic cylinders 43 are pivotally connected to the linkage assemblies 60. The auxiliary roller row hydraulic cylinders 43 are pivotally connected to the frame 2 at pivots 67 on mounting flanges 68 fixedly mounted on the frame 2. Two identical transversely spaced-apart linkage assemblies 60 are associated with and connected to each of the auxiliary roller row hydraulic cylinders 43, as best seen in FIG. 2B and FIG. 2D (only one pair of four pair labeled in FIG. 2B). The two identical transversely spaced-apart linkage assemblies 60 associated with and connected to a given auxiliary roller row hydraulic cylinder 43 are connected together by a cross-brace 81 to provide stability and structural strength to the spaced-apart linkage assemblies 60 connected to the given auxiliary roller row hydraulic cylinder 43. The auxiliary roller row hydraulic cylinders 43 may be operated in tandem or independent of each other. The auxiliary roller row hydraulic cylinders 43 are operated independently of the main roller row hydraulic cylinders 33.

Figure 2A:
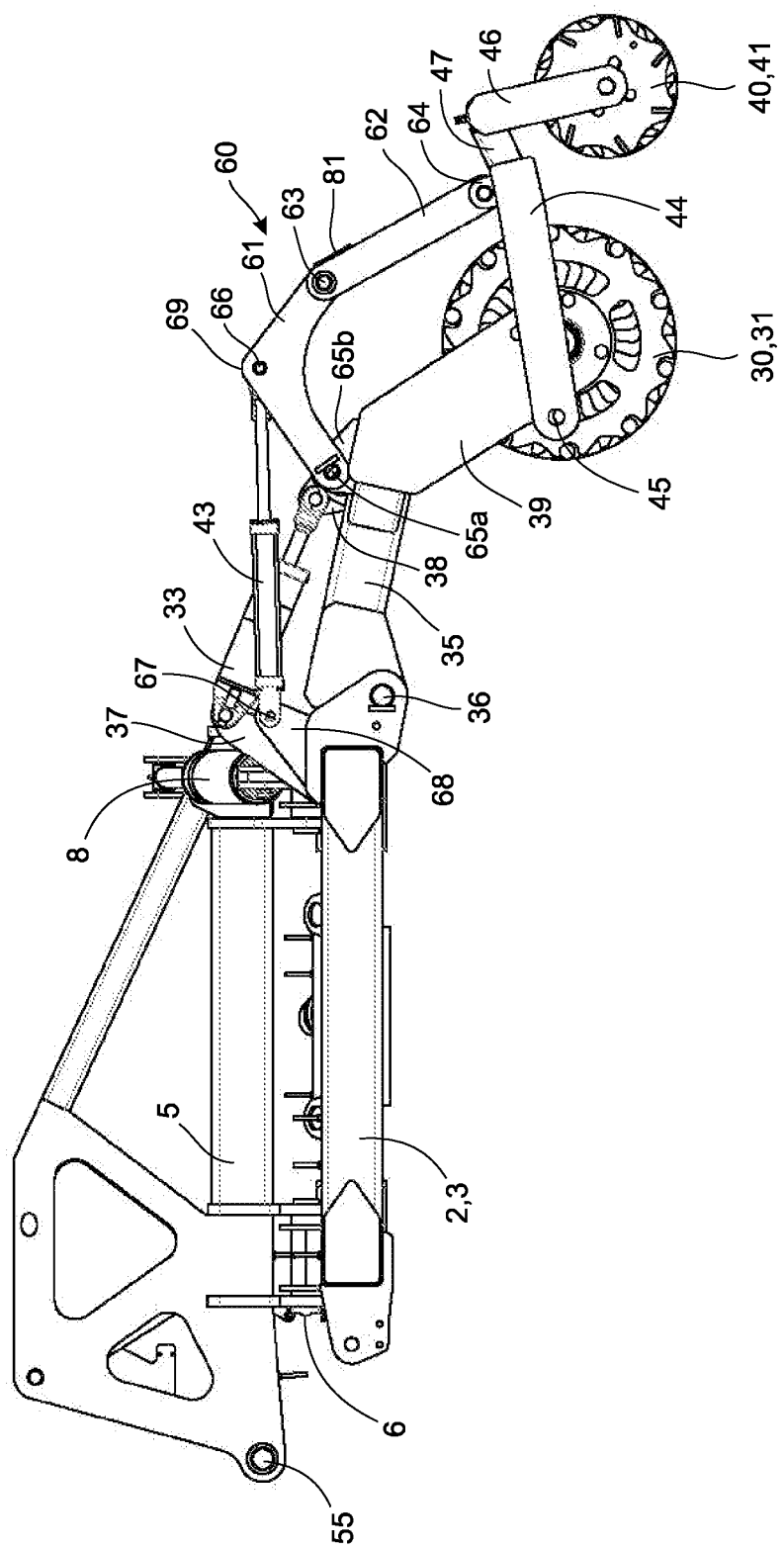
FIG. 2A is a left side view of a rear of the tillage implement of FIG. 1A omitting the front two rows of tillage tools and showing the main rollers and auxiliary rollers in ground-engaging positions.
Figure 2D:
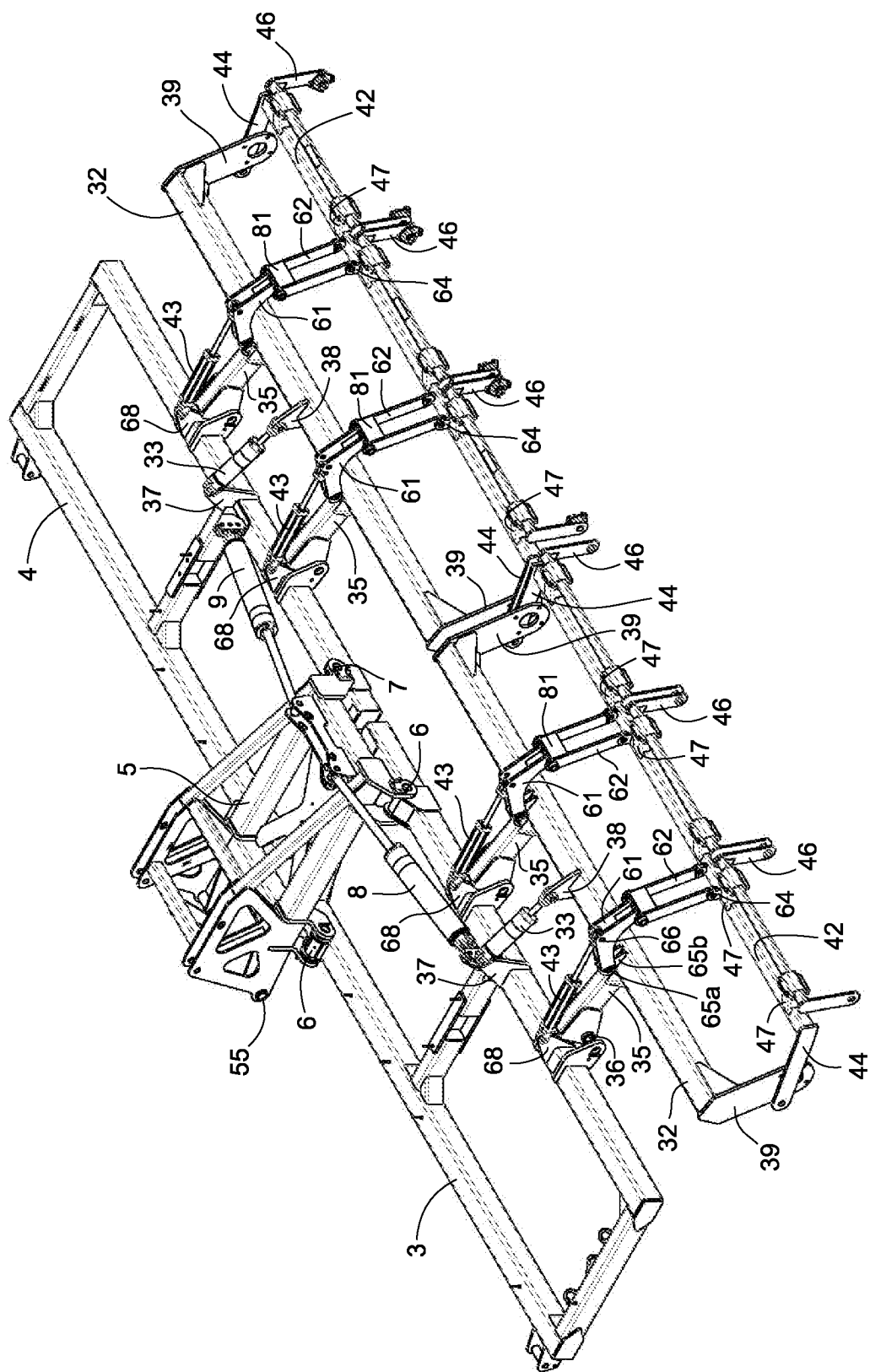
FIG. 2D is a rear left side perspective view of FIG. 2B with the rollers omitted.
Figure 3A:
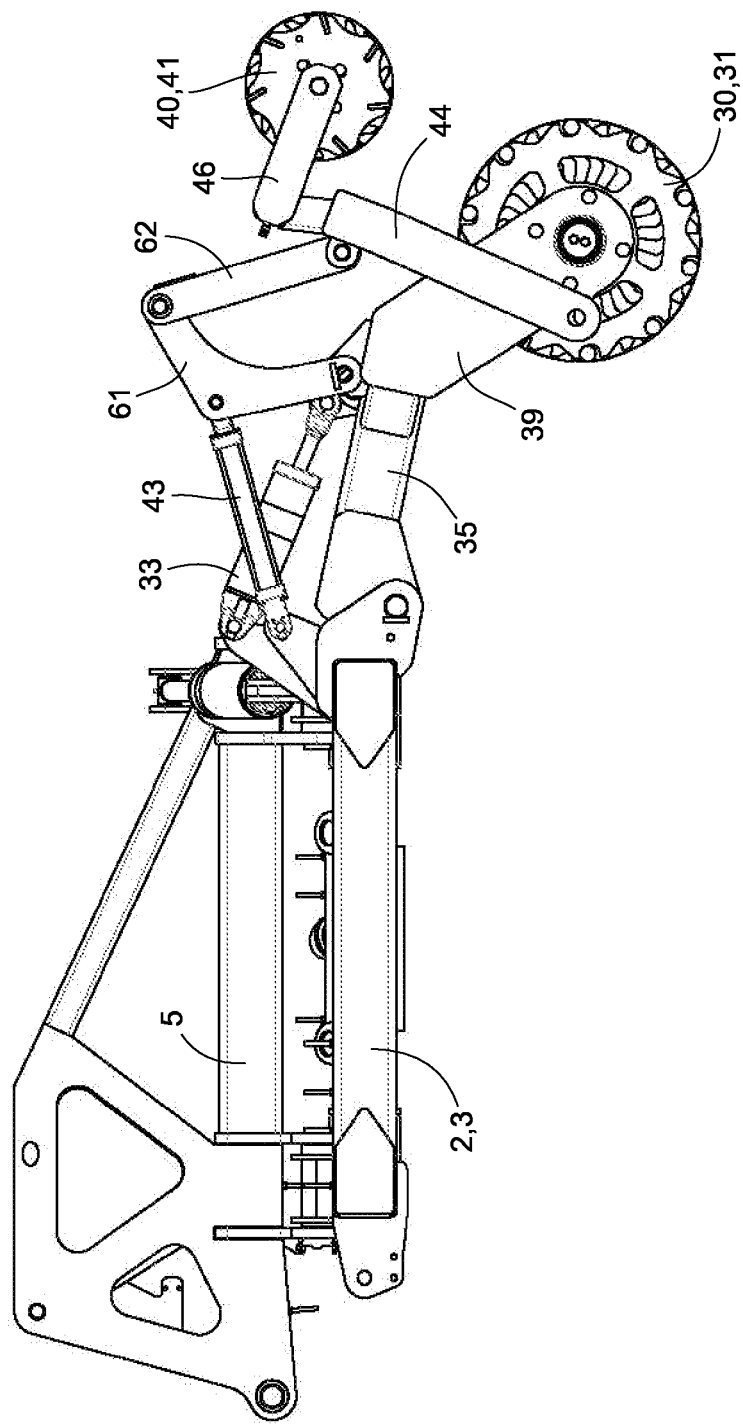
FIG. 3A is the same as FIG. 2A except that the row of auxiliary rollers is pivoted up so that the auxiliary rollers are in ground-disengaged positions.
Figure 4A:
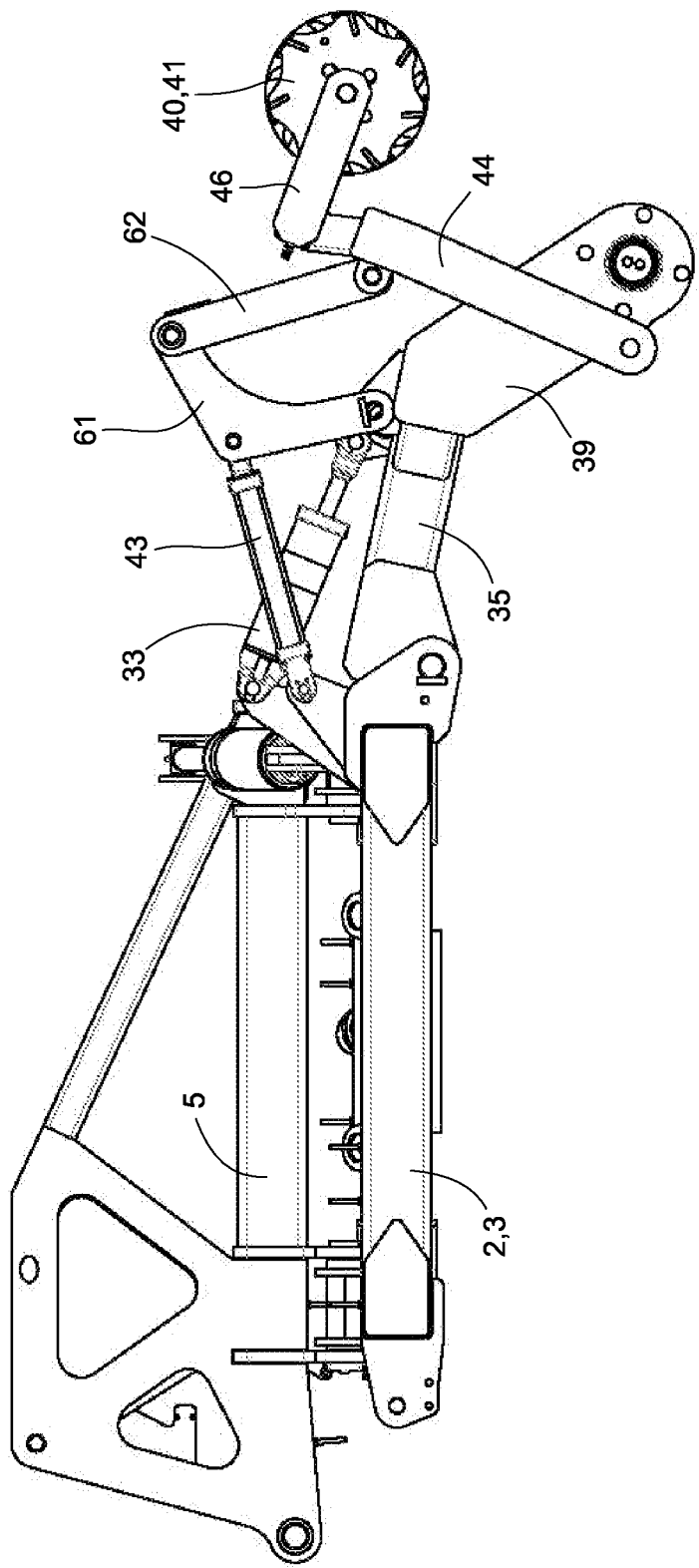
FIG. 4A is the same as FIG. 3A except that the main rollers are omitted.
Figure 4B:
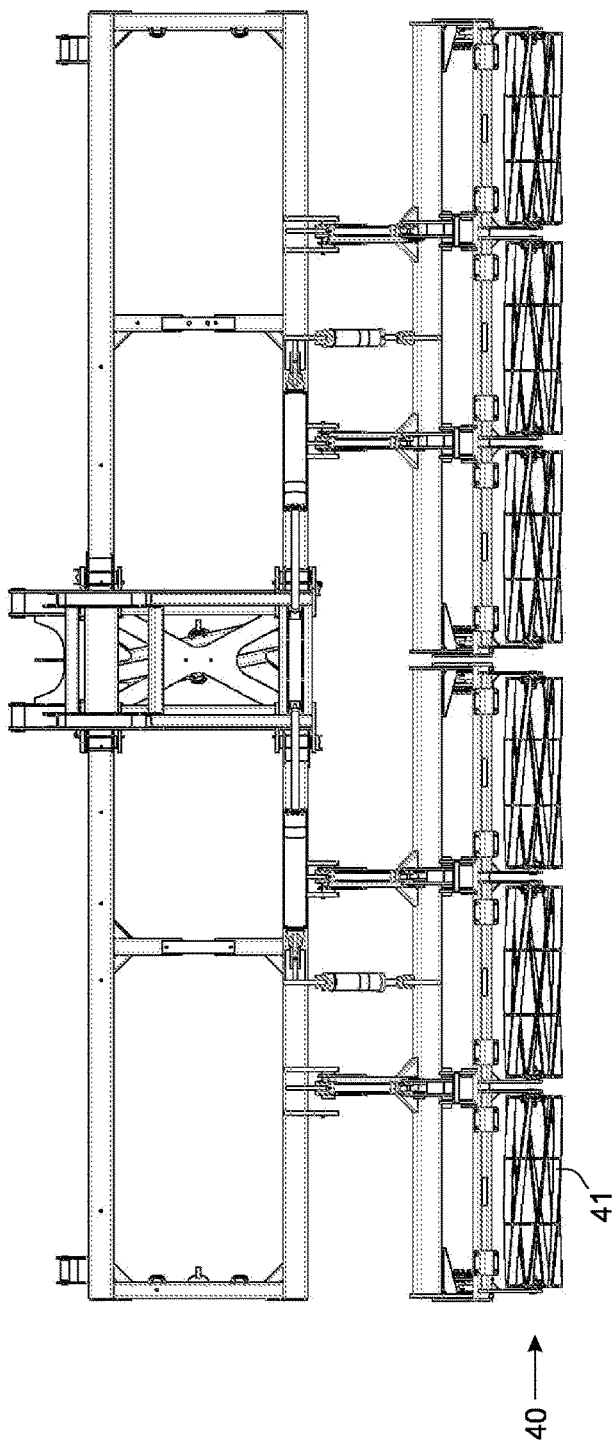
FIG. 4B is a top view of FIG. 4A.
Figure 4C:
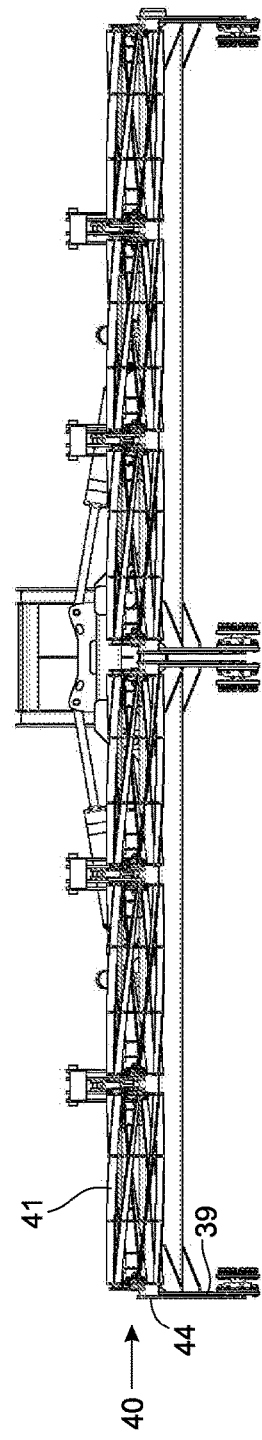
FIG. 4C is a rear view of FIG. 4A.

As evidenced by comparing FIG. 2A to FIG. 3A or FIG. 4A, operation of the auxiliary roller row hydraulic cylinders 43 causes the row 40 of auxiliary rollers 41 to move arcuately up and down to respectively disengage from or engage with the ground. By operation of the roller row hydraulic cylinders 43, the linkage assemblies 60 can be folded together as seen in FIG. 3A to raise the row 40 of auxiliary rollers 41 or can be straightened as seen in FIG. 2A to lower the row 40 of auxiliary rollers 41. Because the auxiliary roller row hydraulic cylinders 43 are operated independently of the main roller row hydraulic cylinders 33, raising and lowering can be accomplished as needed and on the go by the operator during a tillage operation. The auxiliary rollers 41 have smaller diameters than the main rollers 31, and are therefore better suited for fine seedbed preparation. Further, with the linkage assemblies 60 straightened and the auxiliary rollers 41 in contact with the ground, the auxiliary roller row hydraulic cylinders 43 may be readily operated to adjust down pressure on the auxiliary rollers 41 to balance the weight of the implement 1 between the wheels 54 and the rear of the implement 1, without needing to make adjustments to the row 30 of main rollers 31.

Figure 5:
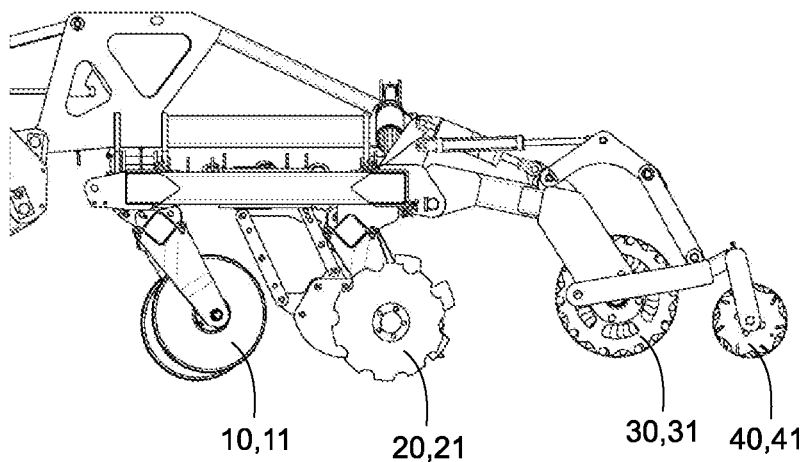
FIG. 5 is a left side view of a rear of the tillage implement of FIG. 1A showing a front first transverse row of tillage tools comprising smooth coulters and a second transverse row of tillage tools comprising notched coulters.
Figure 6:
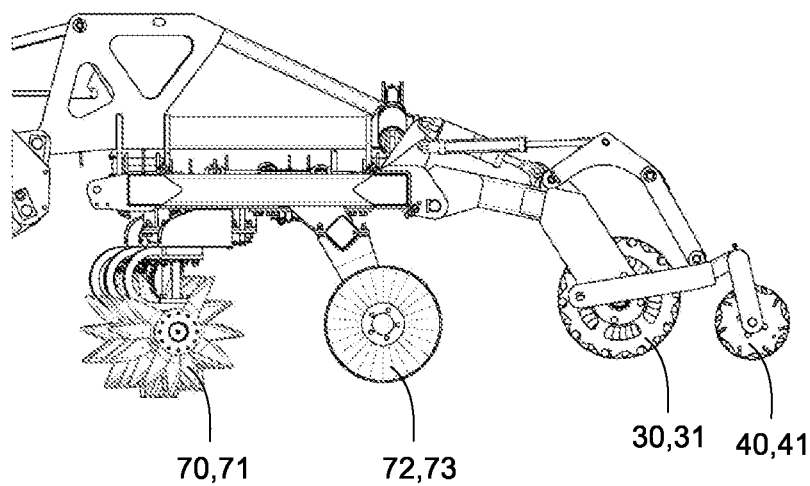
FIG. 6 is the same as FIG. 5 except that the first row of tillage tools comprises rollers of aeration tines and the second row of tillage tools comprises fluted coulters.
Figure 7:
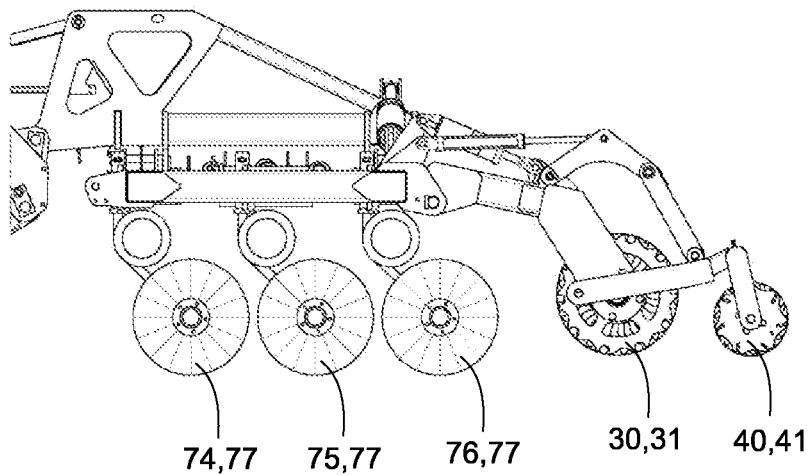
FIG. 7 is a left side view of a rear of a tillage implement in a deployed configuration, the tillage implement having four transverse rows of tillage tools including three transverse rows of spring-loaded rippled coulters, a transverse row of main rollers to the rear of the three rows of the spring-loaded rippled coulters, and also having an independently pivotable transverse row of auxiliary rollers mounted at a rear end of the tillage implement, the row of auxiliary rollers pivotable up and down about a transverse pivot axis.

FIG. 5, FIG. 6 and FIG. 7 illustrate tillage implements having a pivotable transverse row 40 of auxiliary rollers 41 and a pivotable transverse row 30 of main rollers 31, but having different rows of secondary tillage tools forward of the transverse row 30 of main rollers 31. The implement of FIG. 5 is the same as the implement of FIG. 1A where the forwardmost transverse row 10 of secondary tillage tools comprises smooth coulters 11 and the second transverse row 20 of secondary tillage tools comprises notched coulters 21. The implement of FIG. 6 also has two transverse rows of secondary tillage tools forward of the row 30 of main rollers 31 except that a forwardmost row 70 of secondary tillage tools comprises rollers of aeration tines 71 and a second row 72 of secondary tillage tools comprises fluted coulters 73. The implement of FIG. 7 has three transverse rows 74, 75, 76 of secondary tillage tools 77 forward of the transverse row 30 of main rollers 31, where all of the secondary tillage tools 77 are spring-loaded rippled coulters. It is understood that a single row of secondary tillage tools could comprise more than one type of tillage tool, if desired.

Figure 8:
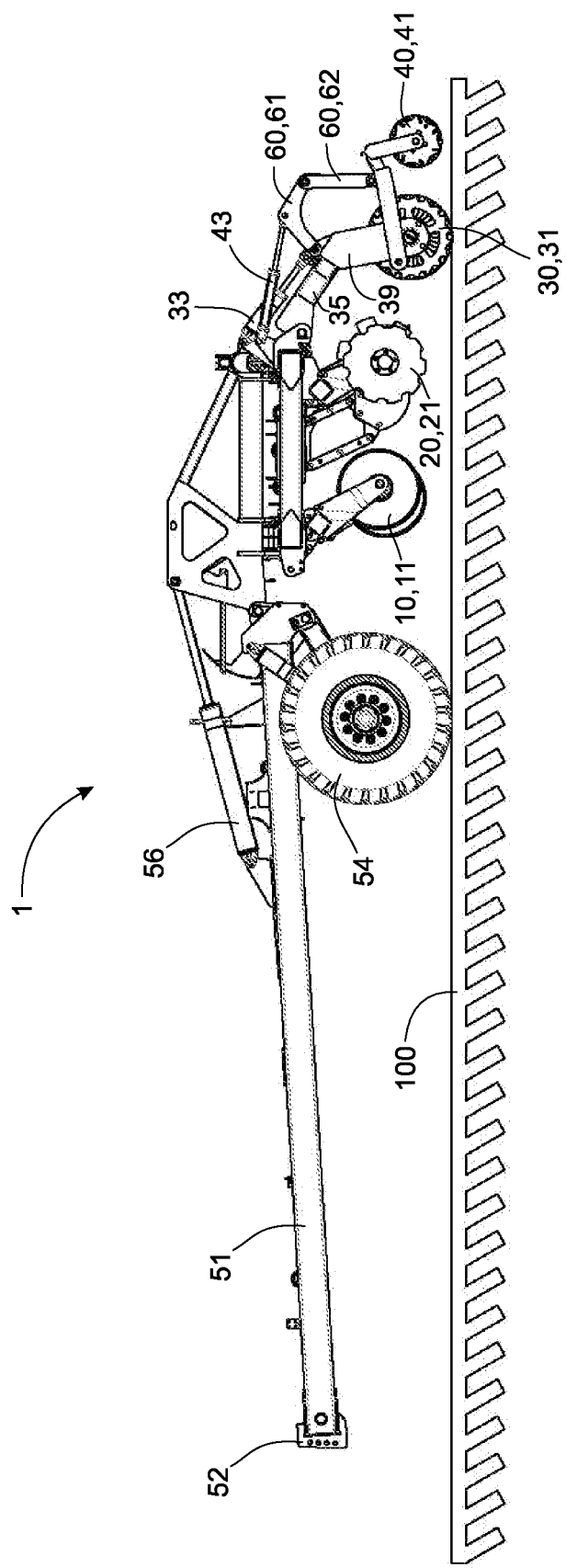
FIG. 8 is a left side view of the tillage implement of FIG. 1A resting on the ground showing how the transverse row of auxiliary rollers is raised off the ground when the transverse row of main rollers is lowered further.

FIG. 8 depicts the tillage implement 1 resting on ground 100 showing how the transverse row 40 of auxiliary rollers 41 and the forwardmost row 10 and second row 20 of secondary tillage tools 11, 21 are raised off the ground 100 when the transverse row 30 of main rollers 31 is lowered further by the action of the main roller row hydraulic cylinders 33. The action of the auxiliary roller row hydraulic cylinders 43 is independent of the main roller row hydraulic cylinders 33, therefore pivoting of the row 40 of auxiliary rollers 41 can be controlled independently. In the configuration shown in FIG. 8, the implement 1 can be towed without skidding of the auxiliary rollers 41 on the ground 100, and down pressure from the row 40 of auxiliary rollers 41 is not needed to balance the weight of the implement 1. Thus, the geometry of the transverse row 40 of auxiliary rollers 41 and in the deployed configuration is such that if the transverse row 30 of main rollers 31 lifts the implement 1 off the ground, the transverse row 40 of auxiliary rollers 41 is also disengaged from the ground to prevent wear and tear and sideways skidding forces normally experienced at headlands if the auxiliary rollers 41 had not been disengaged from the ground.

Figure 9A:
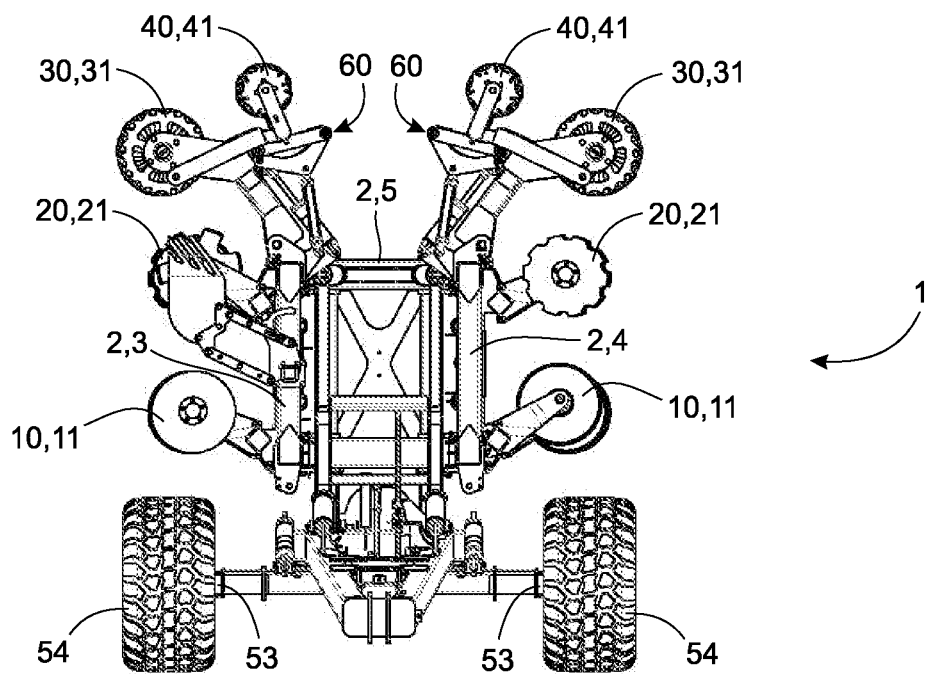
FIG. 9A is a front view of the tillage implement of FIG. 1A folded into a transport configuration.
Figure 9B:
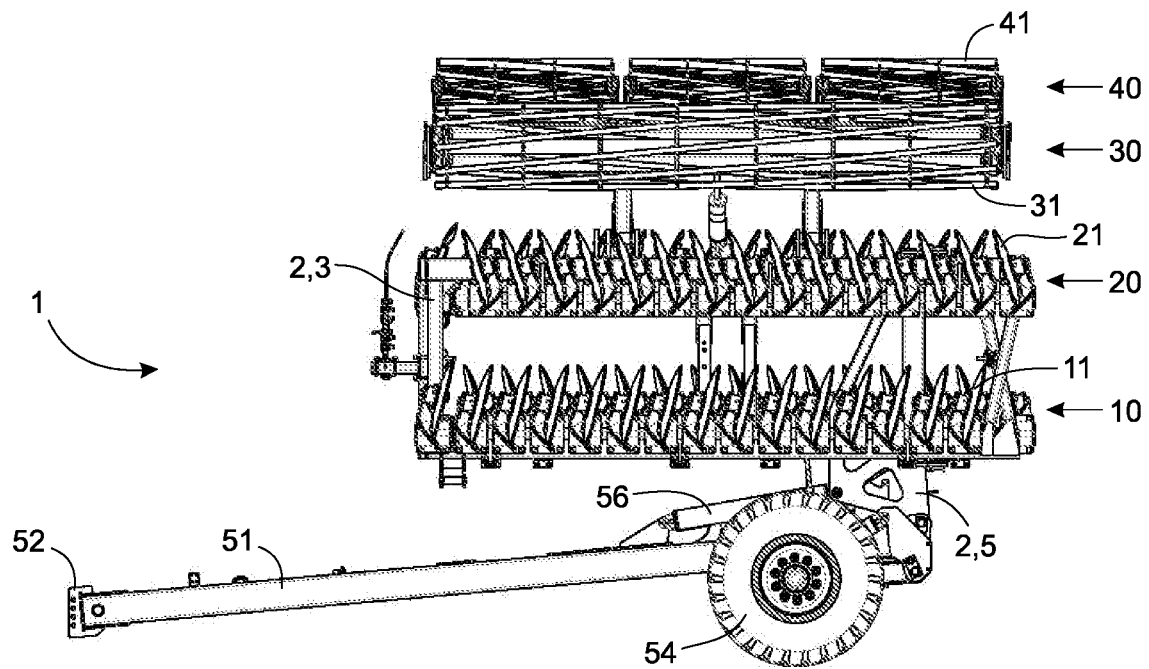
FIG. 9B is a left side view of FIG. 9A.

FIG. 9A and FIG. 9B illustrate the tillage implement 1 folded into the transport configuration. There are a number of different ways to configure the implement 1 into the transport configuration. In one embodiment, the row 40 of auxiliary rollers 41 is first raised to a position where the linkage assemblies 60 are in a most folded configuration. Then, the left frame section 3 and the right frame section 4 of the frame 2 are first pivoted vertically upward toward the center of the implement 1 to decrease the overall width of the implement 1. Then the center frame section 5 is pivoted vertically upward and forward to decrease the overall height of the upwardly oriented left and right frame sections 3, 4, respectively. Once the implement 1 is fully configured in the transport configuration as shown in FIG. 9A and FIG. 9B, the row 40 of auxiliary rollers 41 on the left and right frame sections 3, 4 is at the highest point, but the row 40 of auxiliary rollers 41 is not much higher than the row 30 of main rollers 31 due to the folding of the linkage assemblies 60. Thus, the presence of the row 40 of auxiliary rollers 41 does not severely impact the transportability of the implement 1 in the transport configuration.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A tillage implement comprising:
   a frame connectable to a towing vehicle, the frame comprising a plurality of elongated transverse frame elements and a plurality of elongated longitudinal frame elements connected to the plurality of elongated transverse frame elements, the frame having a horizontal longitudinal axis parallel to a direction of travel of the tillage implement and a horizontal transverse axis perpendicular to the horizontal longitudinal axis when the tillage implement is in a deployed configuration to till a field;
   at least two transverse rows of secondary tillage tools mounted on the frame, the at least two transverse rows comprising a row of main rollers mounted on the frame rearward of all other rows of the at least two transverse rows;
   a transverse row of auxiliary rollers mounted rearward of the row of main rollers, the transverse row of auxiliary rollers independently pivotable vertically about an auxiliary roller transverse pivot axis;
   at least one ground-engaging wheel, and
   at least one auxiliary roller row actuator connecting the row of auxiliary rollers to the frame, whereby pivoting of the row of auxiliary rollers is caused by actuation of the at least one auxiliary roller row actuator,
   wherein each of the at least one auxiliary roller row actuators is pivotally connected to the frame, and each of the at least one auxiliary roller row actuators is pivotally connected to the row of auxiliary rollers by a corresponding linkage assembly, each corresponding linkage assembly pivotally connected to the row of main rollers, and
   wherein each corresponding linkage assembly comprises a first linkage arm and a second linkage arm, wherein:
      the first linkage arm is pivotally connected to the corresponding auxiliary roller row actuator, the second linkage arm and the row of main rollers; and
      the second linkage arm is pivotally connected to the first linkage arm and the row of auxiliary rollers.

2. The implement of claim 1, wherein the row of main rollers is pivotably mounted on the frame, whereby pivoting of the row of main rollers causes the frame to translate vertically when the main rollers are engaging the field.

3. The implement of claim 2, further comprising at least one main roller row actuator connecting the row of main rollers to the frame, whereby pivoting of the row of main rollers is caused by actuation of the at least one main roller row actuator.

4. The implement of claim 3, wherein the at least one main roller row actuator comprises at least one main roller hydraulic cylinder.

5. The implement of claim 2, wherein the row of main rollers is pivotably connected to the frame by at least one of the longitudinal frame elements, the at least one of the longitudinal frame elements pivotally connected to at least one of the transverse frame elements of the frame.

6. The implement of claim 4, wherein the at least one auxiliary roller actuator comprises at least one auxiliary roller hydraulic cylinder.

7. The implement of claim 1, wherein the first linkage arm comprises a bent plate,
   the first linkage arm is pivotally connected to the second linkage arm proximate a first end of the bent plate,
   the first linkage arm is pivotally connected to the row of main rollers proximate a second end of the bent plate, and
   the first linkage arm is pivotally connected to the corresponding auxiliary roller actuator proximate a bend in the bent plate between the first and second ends.

8. The implement of claim 1, wherein each auxiliary roller in the row of auxiliary rollers have smaller diameters than each main roller in the row of main rollers.

9. The implement of claim 1, wherein the secondary tillage tools comprise coulters, rollers or both coulters and rollers.

10. The implement of claim 1, wherein the at least two transverse rows of secondary tillage tools comprise at least three rows of secondary tillage tools.

11. The implement of claim 1, wherein the at least one ground-engaging wheel is located longitudinally forward of all of the tillage tools.

12. The implement of claim 1, wherein the at least one ground-engaging wheel comprises two transversely spaced-apart ground-engaging wheels.

13. The implement of claim 1, further comprising a forwardly extending tongue connected to the frame for connecting the implement to the towing vehicle.

14. The implement of claim 1, wherein the frame is foldable between a folded transport position and an unfolded deployed configuration.

15. The implement of claim 14, wherein the frame comprises a wing frame section and a center frame section, the frame sections pivotable about respective frame section pivot axes to fold the frame into the transport configuration and to unfold the frame into the deployed configuration.

16. The implement of claim 14, wherein the frame comprises left, right and center frame sections, the frame sections pivotable about respective frame section pivot axes to fold the frame into the transport configuration and to unfold the frame into the deployed configuration.

* * * * *